United States Patent [19]

Wickham et al.

[11] Patent Number: 4,492,412
[45] Date of Patent: Jan. 8, 1985

[54] BRAKING CYLINDER INLET VALVE ARRANGEMENT IN BRAKING SYSTEMS FOR RAILWAY VEHICLES

[75] Inventors: David J. Wickham; Clive A. Rathband, both of Chippenham, England

[73] Assignee: Westinghouse Brake and Signal Company Limited, Chippenham, England

[21] Appl. No.: 416,075

[22] Filed: Sep. 8, 1982

[30] Foreign Application Priority Data

Sep. 11, 1981 [GB] United Kingdom ............... 8127542

[51] Int. Cl.³ ............................................ B60T 15/20
[52] U.S. Cl. .................................... 303/32; 303/33; 303/40
[58] Field of Search ............... 303/28, 32, 33, 35–40, 303/45–46, 57–67, 86, 81, 80, 77, 82

[56] References Cited

U.S. PATENT DOCUMENTS

| | | | |
|---|---|---|---|
| 3,180,695 | 4/1965 | McClure | 303/86 |
| 3,731,982 | 5/1973 | Paginton | 303/33 |
| 4,161,340 | 7/1979 | Hart | 303/33 |

Primary Examiner—Douglas C. Butler
Attorney, Agent, or Firm—Larson and Taylor

[57] ABSTRACT

This invention relates to braking systems for railway vehicles in which a fall in brake pipe pressure is employed to initiate braking via a brake cylinder inlet valve.

In accordance with the present invention, the brake cylinder inlet valve is rendered in-operative by the absence of auxiliary reservoir pressure, thus dispensing with the need for a complicated mechanical sequence requiring fine machining tolerances etc. and avoiding the necessity of employing an additional valve.

The brake cylinder (BC) inlet valve 60 is operable by a diaphragm 54. When the system is fully charged, the brake cylinder inlet valve 60 is closed as shown in the accompanying drawing. The diaphragm 54 is subject to brake pipe pressure in chamber C and to auxiliary reservoir pressure in chamber D. In the absence of auxiliary reservoir pressure in chamber D, the pressure in chamber C holds the diaphragm in the position shown and prevents the ball valve 60 from being opened, thus preventing brake application until braking is demanded.

3 Claims, 1 Drawing Figure

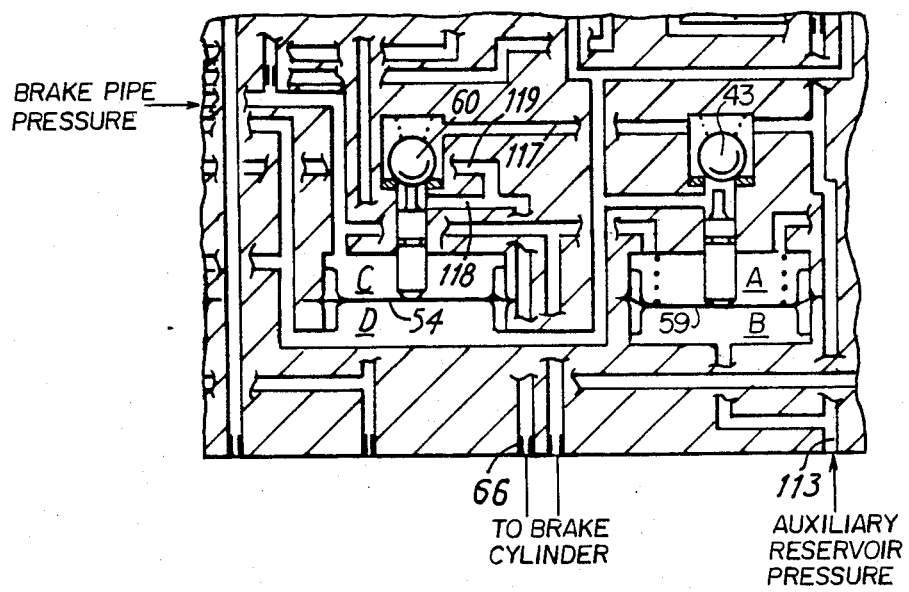

BRAKING CYLINDER INLET VALVE ARRANGEMENT IN BRAKING SYSTEMS FOR RAILWAY VEHICLES

FIELD OF THE INVENTION

This invention relates to braking systems for railway vehicles in which a fall in brake pipe pressure is employed to initiate braking via a brake cylinder inlet valve. The invention may, for example, be applied to the braking system control valve arrangement described in the specification of our co-pending British application No. 416,079 filed 9/8/82 (Case 3932 - Control Valve Arrangement and the corresponding U.S. application Ser. No. 416,079), but it is not limited to that particular control valve arrangement.

BACKGROUND OF THE INVENTION

In conventional systems, operation of the brake cylinder is controlled by a brake cylinder inlet valve which is rendered in-operative by mechanical means such as a spring, or a mechanical sequence, until braking is demanded.

SUMMARY OF THE INVENTION

In accordance with the present invention, the brake cylinder inlet valve is rendered in-operative by the absence of auxiliary reservoir pressure, thus dispensing with the need for a complicated mechanical sequence requiring fine machining tolerances etc. and avoiding the necessity of employing an additional valve.

Preferably the brake cylinder inlet valve is diaphragm-operated and the diaphragm is subject to brake pipe pressure on one side and auxiliary reservoir pressure on the other side so that when the auxiliary reservoir pressure is not available, the brake cylinder inlet valve remains in-operative or closed. When braking is demanded and auxiliary reservoir pressure is supplied to the brake cylinder inlet valve diaphragm this causes the brake cylinder inlet valve to open and thus feed air to the brake cylinder.

It will be appreciated from a study of the specification of our co-pending application mentioned above that once the pilot maintaining valve is open, the pilot pressure corresponds to auxiliary reservoir pressure. In the particular arrangement described in the specification, the brake cylinder inlet valve is held out of commission until the bi-stable operator has switched to the application position to feed pilot pressure into the chamber on the underside of the brake cylinder inlet valve diaphragm.

BRIEF DESCRIPTION OF THE DRAWING

The accompanying single FIGURE of the drawings illustrates one embodiment of the present invention.

The drawing should be read in conjunction with FIG. 2 of our co-pending application mentioned above as it forms part of that FIGURE.

DETAILED DESCRIPTION OF THE PREFERRED EMBODIMENT

In the accompanying drawing, there is shown the brake cylinder (BC) inlet valve 60 operable by a diaphragm 54. When the system is fully charged, the brake cylinder inlet valve 60 is closed as shown in the accompanying drawing. The diaphragm 54 is subject to brake pipe pressure in chamber C and to auxiliary reservoir pressure in chamber D. In the absence of auxiliary reservoir pressure in chamber D, the pressure in chamber C holds the diaphragm in the position shown and prevents the ball valve 60 from being opened.

As described more fully in our co-pending application mentioned above, a drop in brake pipe pressure will initiate supply of auxiliary reservoir pressure to chamber D due to the action of application ball valve means 43. As shown, ball valve means 43 is opened to feed auxiliary reservoir pressure to chamber D by a diaphragm 59, which is subject to brake pipe pressure in chamber A and auxiliary reservoir pressure in chamber B. The diaphragm 54 will be operated so as to open ball valve 60 as soon as the brake pipe pressure falls below auxiliary reservoir pressure. Thus the reduction in brake pipe pressure below auxiliary reservoir pressure, which initiated the brake application, and any subsequent further reductions in brake pipe pressure then cause the brake cylinder inlet valve 60 to open and feed auxiliary reservoir pressure via ports 113 and 117 into the brake cylinder via port 118 and the brake cylinder application choke 66.

Until closure of the inshot valve (see FIG. 2 of co-pending application mentioned above, numeral 63) at approximately 10 p.s.i. in the brake cylinder, air also feeds via port 119, the open inshot valve and port into the brake cylinder.

The BC inlet valve 60 is a self-lapping valve since reductions in brake pipe pressure below auxiliary reservoir pressure which cause the ball valve to open, also result in the AR pressure being depleted. Hence the pressures in the chambers C and D are almost equalised and the ball valve 60 re-closes.

The operation of the remainder of the valve assembly, including the inshot valve and the BC exhaust valve, and the way in which the pilot pressure is set-up and maintained, are fully described in our above-mentioned co-pending patent application.

The invention may be applied to any braking system of the kind in which a fall in brake pipe pressure is employed to initiate braking via a brake cylinder inlet valve.

Having thus described our invention what we claim is:

1. A brake cylinder inlet valve arrangement for the braking system of a railway vehicle including a brake pipe pressure, an auxiliary reservoir pressure, and a brake cylinder, said brake cylinder inlet valve arrangment comprising:
   an actuating means for said brake cylinder inlet valve means for opening said valve means when supplied with an axiliary reservoir pressure; and means for opening said valve means when supplied with an auxiliary reservoir presure; and
   an application valve means for supplying auxiliary reservoir pressure to said actuating means only when said brake pipe pressure is less than said auxiliary reservoir pressure such that said brake cylinder inlet valve means is interlocked so as to be not actuatable until said application valve means is first actuated.

2. A brake cylinder inlet valve arrangement as claimed in claim 1 wherein said actuating means includes a diaphragm, a moving means for opening said brake cylinder inlet valve means upon movement of said diaphragm in one direction, and a supply means for supplying brake pipe pressure to one side of said diaphragm to urge said diaphragm in an opposite direction to the one direction; and wherein said application valve means supplies auxiliary reservoir pressure to the other side of said diaphragm such that said diaphragm only moves in the one direction when biased by the auxiliary reservoir pressure which exceeds the brake pipe pressure.

3. A brake cylinder inlet valve arrangement as claimed in claim 2 wherein said brake cylinder inlet valve means supplies auxiliary reservoir air to the brake cylinder.

* * * * *